No. 759,231. PATENTED MAY 10, 1904.
F. H. BISSELL.
VAPOR GENERATING AND LIGHTING APPARATUS.
APPLICATION FILED MAY 4, 1903.
NO MODEL. 2 SHEETS—SHEET 1.
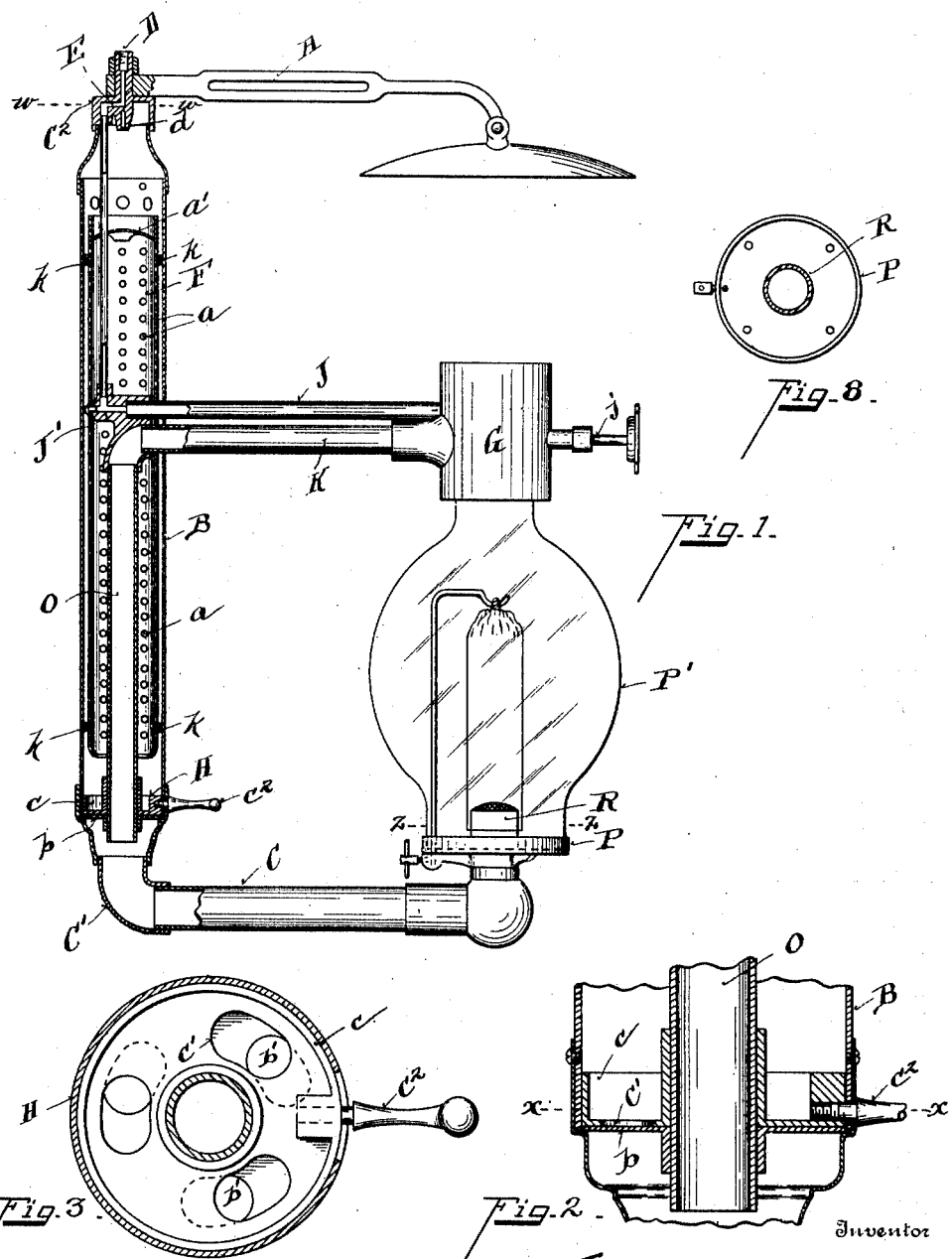
Witnesses
Oliver B. Kaiser
Lulu Beck
Inventor
Frank H. Bissell
By
Wood & Wood
Attorneys No. 759,231. PATENTED MAY 10, 1904.
F. H. BISSELL.
VAPOR GENERATING AND LIGHTING APPARATUS.
APPLICATION FILED MAY 4, 1903.
NO MODEL. 2 SHEETS—SHEET 2.
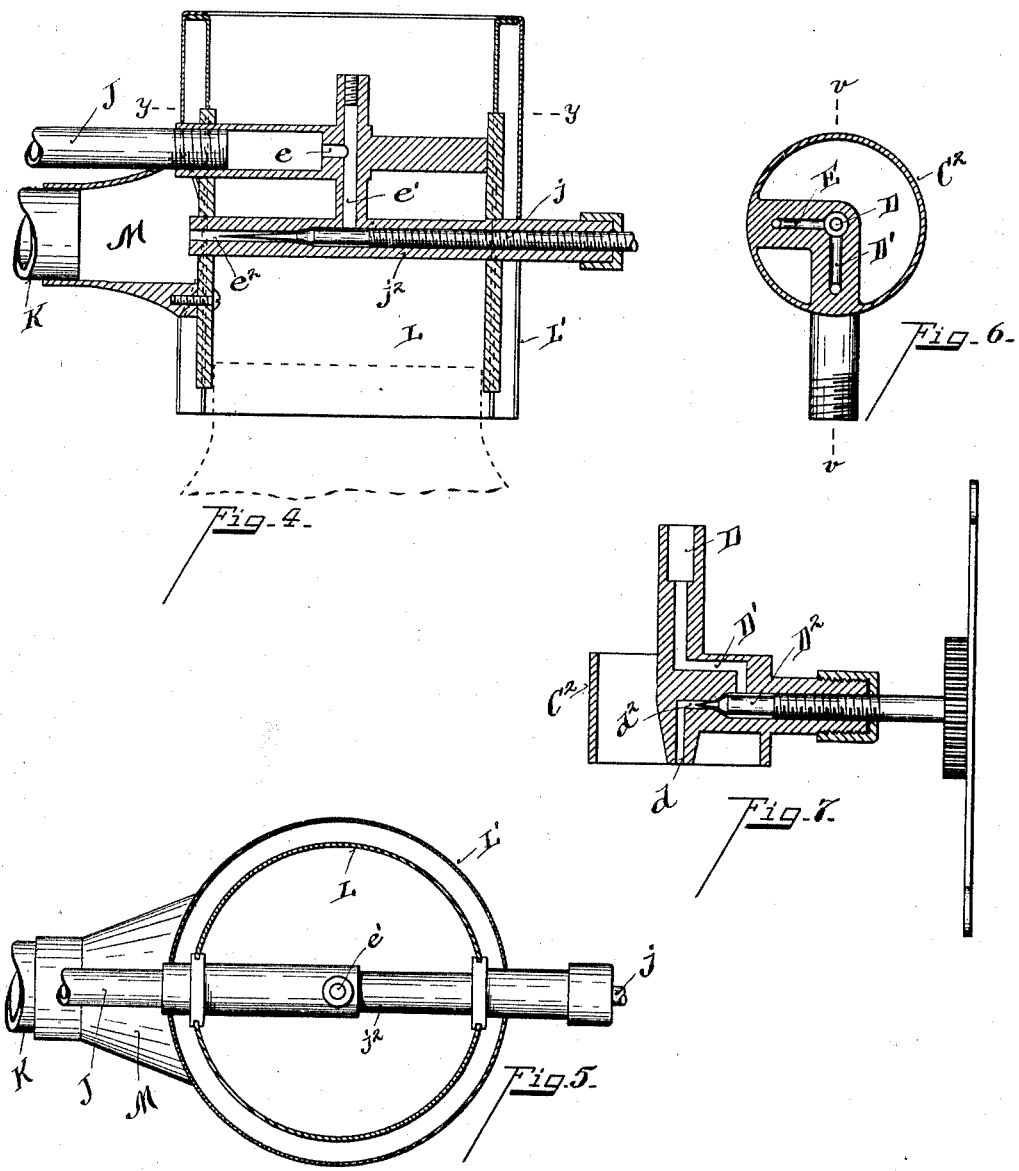

No. 759,231. Patented May 10, 1904.

UNITED STATES PATENT OFFICE.

FRANK H. BISSELL, OF DAYTON, OHIO.

VAPOR GENERATING AND LIGHTING APPARATUS.

SPECIFICATION forming part of Letters Patent No. 759,231, dated May 10, 1904.

Application filed May 4, 1903. Serial No. 155,503. (No model.)

*To all whom it may concern:*

Be it known that I, FRANK H. BISSELL, a citizen of the United States, residing at Dayton, in the county of Montgomery and State of Ohio, have invented certain new and useful Improvements in Vapor Generating and Lighting Apparatus, of which the following is a specification.

My invention relates to a vapor generator and carbureter for illuminating burners in which the product of combustion of gases is produced from gasolene or other vaporizing liquids.

The invention herein shown and described consists of devices shown but not claimed in my previous application, filed June 28, 1902, Serial No. 133,956, together with modifications and improvements thereon.

The objects of my invention are, first, to combine with a burner a carbureter for terminating in the burner-pipe, with means for supplying cold carbureted gas for perfect combustion, also combined with the burner apparatus carbureters and a generator heated by the burner appliance and having an independent supply of vapor, and carbureters, interposed between the generator and the burner-pipe, conveying hot and cold gases to the burner.

Another object of my invention is to apply means for regulating the flow of the vapor from two independent sources of gas-supply, and also means for regulating the carbureting of both hot and cold gases.

Another object of my invention is to start the generation of hot gases by burning the carbureted cold gases and so combine the parts that an incandescent light may be maintained by the supply of hot gas alone or by a mixture of hot and cold carbureted gases.

Another object of my invention is to apply a regulator for regulating the supply of air to support combustion, so that the gas before it reaches the burner is supplied with all the oxygen necessary for combustion, which regulator applies to the carbureting of both the hot and cold gases.

Another object of my invention is to provide a mantle and a burner-pipe and a carbureter of such efficiency as to supply oxygen to fully support combustion within the mantle and employ air circulation around the mantle to prevent underheating of the chimney.

Another object of my invention is to combine with the burner a generator and a carbureter, with a regulator so arranged that a high incandescent candle-power light may be maintained and a lower candle-power light of a range approximately of fifty to one thousand candle-power, and that this change can be quickly made by simple change of the regulator for the carbureter whether the burner be supplied by either hot or cold carbureted gas, or both.

The features of my invention are more fully set forth in the description of the accompanying drawings, forming a part of this specification, in which—

Figure 1 is a central vertical section, partly in elevation, of my device. Fig. 2 is an enlarged section of the carbureter-regulator. Fig. 3 is a section on line $x\ x$, Fig. 2. Fig. 4 is an enlarged vertical section of the generator. Fig. 5 is a section on line $y\ y$, Fig. 4. Fig. 6 is an enlarged section on line $w\ w$, Fig. 1. Fig. 7 is a section on line $v\ v$, Fig. 6. Fig. 8 is a section on line $z\ z$, Fig. 1.

The accompanying drawings represent a burner or lighting apparatus in which are combined in one self-contained device a carbureter for highly-carbureted cold gas and a generator for heating, generating, and carbureting hot gas, both forming an independent but common source for supplying one and the same burner with carbureted gas to support combustion and when the heated carbureting vapor is used to produce an incandescent light of exceedingly-high candle-power. This apparatus is suspended, preferably, by the bracket A.

B represents the tube or shell forming the carbureter-case. It is secured to the burner-pipe C by the elbow-pipe C'. $C^2$ represents the cap closing the top of the carbureter and to which the bracket A is rigidly attached, and these parts form the framework of the apparatus. The carbureting or mixing of vapor and air is carried on inside of this shell or frame.

I will first describe the carbureting of the cold vapor and the parts of the apparatus as preferably constructed for this purpose.

D is a casting arranged for attachment to an oil-supply pipe, provided with the outlet-nozzle $d$ and a flange or cap $C^2$. A casing B is attached to the cap $C^2$ and is closed at its bottom by the end plate $b$, which is provided with perforations $b'$. A revolving damper-plate H is mounted on the plate $b$ and is provided with openings which may be turned into or out of register with the openings $b'$. A conducting-tube C is attached to the end of the casing B by the elbow $C'$, and the burner R is mounted on the end of the tube C. The tube C also supports the globe-support P, on which is mounted the globe or chimney $P'$, surrounding the burner.

G represents a hot-vapor generator. In detail it is shown as a cap or shell provided with double walls L and $L'$, is mounted over the top of the chimney $P'$ in such manner that the inner wall surrounds the top of the chimney, and the space formed between the two walls of the cap is closed at the upper end of the cap by flanges formed on the walls L and $L'$. The hot-vapor-delivery tube K is connected by the mixing-throat M around the space between the walls of the cap or shell G, admitting the free egress of heated air between the walls L and $L'$ to the mixer. The tube K leads to the interior of the casing B and there connects with the tube O, arranged centrally within the gravity-carbureter F, such tube O passing through the plates H and $b$ and serving as a pivot for the plate H. The tube O is open at its lower end and delivers the mixed air and vapor to the conducting-tube C.

The vaporizer is mounted within the inner wall L of the cap G. Such vaporizer is preferably composed of a casting provided with the horizontal passage $e$, a vertical passage $e'$, and a second lower horizontal passage $e^2$. The passage $e^2$ terminates in a vapor-outlet and is arranged to discharge vapor into the open throat M in such manner that the stream of vapor entrains with it the air contained in the space between the walls L and $L'$. Oil is supplied to the vaporizer by the pipe E, which leads from the casting D. Such pipe connects with the horizontal pipe J, which is supported above the mixing-tube K, and the pipe J delivers oil to the passage $e$ of the vaporizer. The outlet of the vaporizer is controlled by the needle-valve $j$, which has a threaded stem mounted in a threaded sleeve $j^2$ of the vaporizer-casting.

A perforated cylinder F is secured within the casing B, such cylinder extending nearly the length of the casing and being spaced from the walls of the casing by lugs $k$ to provide for the free circulation of air around and within such cylinder. A curved plate $a'$ is mounted within the upper end of the cylinder F and receives the hydrocarbon which is allowed to drop from the nozzle $d$.

Perforations in the upper end of the casing or in the cap $C^2$ provide means for admitting air to the interior of the casing to be carbureted, and such air when carbureted falls to the lower portion of the casing and, passing through the openings in the plate $b$, if the damper is open, is conducted by the tube C to the burner.

Mode of operation: Needle-valve $D^2$, tapping the nozzle $d$, is opened to admit gasolene, which drips or passes down to and around the perforated shell F, being carbureted and passes down through the regulator H, thence to the burner-pipe C, thence out through the burner R, which has usually a wire-gauze covering the mouth of the pipe. The carbureted gas is lighted, and the result is when the regulator H has been properly adjusted a light of fifty or more candle power. As a result of the combustion of burner R, the chimney $P'$ conveys the heated currents to the generators, and as the passages $e$ $e'$ are filled with liquid it is heated before the needle $j$ is opened. Now when it is desired to furnish an incandescent light of high candle-power needle-valve $j$ is opened and valve $D^2$ is closed, cutting off the supply of cold carbureted gas, and the gas is expanded and carbureted into the chamber M and passes through the pipe K O, thence to the burner-pipe C, and the flame is maintained by gas carbureted with heated air. It must be apparent that all the heat taken up by the air in the gas in the generator, and thus carried back to the burner, is reclaimed and not wasted, and this retaining of the heat is not only economical, but highly advantageous and producing a better quality of light; but there is another additional advantage in thus reclaiming or taking up the heat of generation and carrying it back through the burner again. The needle-valve $j$ can be adjusted so as to maintain a very small flame and yet maintain the heat for the generator and produce a steady flame. This is in part due to the fact that but a small amount of air is allowed to circulate up through the chimney. Hence the chimney and generator are not materially cooled. It is sometimes desirable to maintain an incandescent light of medium power. This can be done by supplying the burner with both hot carbureted-gas and cold carbureted-gas vapor, the valves $j$ and $D^2$ being regulated so as to cut off a normal part of the gas.

A very important result is accomplished by the method herein shown and described between carbureting the cold vapor to combustion by fully carbureting the gas before it rises to the point of combustion.

When vapor is only partially carbureted before it reaches the point of combustion, requiring the mixing of air outside of the burner and at the point of combustion, it results in unduly cooling the flame, because there is no means of regulating the quantity of oxygen which must freely surround the flame. Hence a more perfect combustion and a higher degree of heat is maintained by a complete supply of oxygen for supporting combustion and mixing it with gas before reaching the burner.

Below the burner I prefer to place a perforated diaphragm, which is usually made of wire-gauze, to aid in the more intimate mixture of the gas and the air.

Having described my invention, I claim—

1. A casing having openings in its upper end, a carbureter in such casing, a burner-tube attached to the lower end of the casing, a damper arranged to close the interior of the casing against such tube, a burner supported on the end of the burner-tube, and a chimney surrounding such burner, a double-walled cap arranged on the upper end of such chimney, a mixer and tube having its end arranged to receive air from the space between the walls of such cap, the said tube penetrating the casing and being arranged centrally therein and having its lower end below the damper, and a vaporizer secured to the cap and arranged to deliver vapor into the open end of the mixing-tube, substantially as described.

2. In a vapor-burner, a burner-tube carrying a burner, a gravity-carbureter connected to the burner-tube, means for supplying air and oil to the carbureter, a generator over the burner, means for supplying oil thereto, a tube from the generator engaging through the gravity-carbureter and extending centrally downward interior of the carbureter to the burner-tube, arranged to receive hot vapor and entrained air, an oil-valve between said generator and said mixing-tube, and a damper between the carbureter and burner-pipe extending around the lower end of said centrally-contained tube from the generator, substantially as described.

3. In a vapor-burner, a burner-tube carrying a burner, a carbureter connected to said burner-tube, means for supplying air and oil to said carbureter, a generator over the burner, means for supplying oil thereto, a tube extending from the generator, taking through into the carbureter and extending downward to and terminating above the burner-tube, and a damper between the carbureter and burner-tube, substantially as described.

4. In a vapor-burner, a burner-tube carrying a burner, a carbureter connected to the burner-tube, means for supplying oil and air thereto, a generator over the burner and provided with a vapor-jet nozzle, means for supplying oil to the generator, a tube arranged to receive vapor from the generator and entrained air and deliver such mixture to the burner-tube, and a damper between said carbureter and burner-tube, substantially as described.

5. In a vapor-burner, a burner-tube carrying a burner, a gravity-carbureter over the burner-tube, means for supplying oil and air thereto, a generator over the burner, means for supplying oil to the generator, a tube arranged to receive entrained air and vapor from the generator passing through the carbureter and terminating above the burner-tube and a damper between the carbureter and burner-tube, substantially as described.

6. In a vapor-burner, a burner-tube, an inclosed burner on the end of said tube receiving its entire supply of air and vapor through said tube, a carbureter, a generator over the burner, means for independently supplying oil and air to said carbureter, means for supplying oil to said generator, a mixing-tube connecting said generator to the burner-pipe, means for supplying heated air to said mixing-tube and a damper between the carbureter and burner-tube, substantially as described.

7. In a vapor-burner, a burner-tube, an inclosed burner on the end receiving its entire supply of vapor and air through said tube, a double-case carbureter, means for supplying air to the outer casing and oil to the inner casing, the outer casing being connected to the burner-tube, a generator over the burner, means for supplying oil thereto, a hot-vapor-delivery tube from the generator, taking through both of said casings and terminating above the burner-tube, and a damper between the carbureter and burner-pipe, substantially as described.

8. In a vapor-burner, a burner-tube carrying a burner on the end, a carbureter, a generator over the burner, means for supplying oil thereto, the carbureter being arranged over one end of the burner-tube, a hot-vapor-delivery tube taking from the generator, through the carbureter and terminating over the burner-tube, means for supplying heated air to said tube and a damper between the carbureter and burner-tube above the delivery end of said hot-vapor-delivery tube, substantially as described.

9. In a vapor-burner, a burner and chimney, a cap provided with double walls, having a central aperture corresponding with the inner wall, the cap having an open bottom, the said inner wall seating over the chimney, a mixer, adapted to receive air from between the double walls of the cap, and an oil-tube constituting a generator, supported in said cap, and discharging into the said mixer, substantially as described.

10. In a vapor-burner, a burner and chimney, a cap provided with double walls, having a central aperture corresponding with the inner wall, the cap having an open bottom, the said inner wall seating over the chimney, a mixer, adapted to receive air from between the double walls of the cap, an oil-tube constituting a generator, supported in said cap, and discharging into the said mixer, and an oil-valve in the said generator oil-tube, substantially as described.

In testimony whereof I have hereunto set my hand.

FRANK H. BISSELL.

Witnesses:
OLIVER B. KAISER,
LOUISE BECK.